United States Patent [19]

Lipert

[11] 4,169,873

[45] * Oct. 2, 1979

[54] FLUID CIRCULATING DEVICE

[75] Inventor: Peter Lipert, Montreal, Canada

[73] Assignee: Aero-Hydraulics Corporation, Montreal, Canada

[*] Notice: The portion of the term of this patent subsequent to Jan. 2, 1981, has been disclaimed.

[21] Appl. No.: 749,670

[22] Filed: Dec. 13, 1976

[51] Int. Cl.$^2$ .............................................. B01F 3/04
[52] U.S. Cl. .......................... 261/121 R; 210/221 R; 261/77
[58] Field of Search ............. 261/121 R, 77, DIG. 75; 210/220, 221; 137/154, 209

[56] References Cited

U.S. PATENT DOCUMENTS

| | | | |
|---|---|---|---|
| 1,746,186 | 2/1930 | Bramwell | 137/209 |
| 2,776,820 | 1/1957 | Bond, Jr. | 261/121 R |
| 3,096,780 | 7/1963 | Kane | 137/209 |
| 3,148,509 | 9/1964 | Laurie | 261/123 |
| 3,246,761 | 4/1966 | Bryan et al. | 261/121 R |
| 3,592,450 | 7/1971 | Rippon | 261/123 |
| 3,826,742 | 7/1974 | Kirk et al. | 261/DIG. 75 |

FOREIGN PATENT DOCUMENTS 179706 6/1962 Sweden ................ 261/121 R

Primary Examiner—Tim R. Miles
Assistant Examiner—Gregory N. Clements

[57] ABSTRACT

A large bubble generator includes a cylindrical gas accumulator tank open at its bottom and having a top wall. An inverted siphon includes a vertical bubble discharge leg coaxial with the tank and projecting upwardly through the tank top wall, and a roughly circular tubular section extending from the bottom of the vertical leg downwardly and outwardly and through the lower part of the tank peripheral wall, and thence upwardly, and thence inwardly into registry with a port in the upper part of the peripheral walls of the tank. Gas supply pipe coupling nipples extend upwardly and outwardly from the upper part of the siphon curved section. The bubble generator is disposed in the lower part of a liquid immersed liquid circulator conduit and is supported by the conduit wall by circumferentially spaced radial struts extending upwardly and outwardly from the accumulator tank to the conduit wall.

6 Claims, 3 Drawing Figures

FLUID CIRCULATING DEVICE

BACKGROUND OF THE INVENTION

The present invention relates generally to improvements in fluid circulating devices, and it relates particularly to an improved large bubble generator.

It is a common procedure in the treatment of sewage and other liquid wastes to form a large body of the liquid and to immerse in the liquid body a vertical conduit exposed at its open ends to the liquid and cyclically generate large bubbles at the bottom of the conduit; the rising bubbles, functioning as pistons, raise the liquid in the conduit to effect the circulation of the liquid in the body of liquid. However, the efficient and reliable generation of the bubbles has presented a problem in commercial operation. The use of an inverted siphon-type of bubble generator, as typified by the bubble generator disclosed in U.S. Pat. No. 3,592,450, granted July 13, 1971 to G. M. Rippon, although of great advantage, does possess drawbacks. The large bubble generators heretofore employed and proposed are large bulky devices as related to the size of the bubble produced and their capacity, and are expensive and awkward to handle; they are difficult to service and maintain, are of little versatility and adaptability, and otherwise leave much to be desired.

SUMMARY OF THE INVENTION

It is a principal object of the present invention to provide an improved fluid circulating device.

Another object of the present invention is to provide an improved fluid circulating device of the type employing a fluid immersed conduit provided with a fluid raising large bubble generator at its lower part.

Still another object of the present invention is to provide an improved large bubble generator for use in fluid circulating devices.

A further object of the present invention is to provide an improved large bubble generator characterized by its simplicity of operation, ruggedness and compactness in construction, high efficiency and reliability in use, and ease of servicing and maintenance, and of great versatility and adaptability.

The above and other objects of the present invention will become apparent from a reading of the following description taken in conjunction with the accompanying drawings which illustrate a preferred embodiment thereof.

In a sense, the present invention contemplates the provision of an improved large gas bubble generator comprising a gas accumulator tank open at its bottom and having a top wall and a peripheral wall, an inverted siphon including a vertically extending gas or bubble discharge tubular leg disposed within the tank and registering with an opening in the top wall of the tank, and terminating in an upper bubble discharge opening, a lower tubular leg extending from the bottom of the gas discharge leg outwardly through an opening in the tank peripheral wall near its bottom, and a reentrant leg extending upwardly and back inwardly into registry with an opening in the upper part of the peripheral wall of the tank, and means for supplying a gas into the accumulator tank.

In the preferred form of the improved bubble generator, the tank is cylindrical and the siphon gas discharge leg is vertical, coaxial with the accumulator tank projecting through and above the top wall of the tank. The remainder of the siphon is a curved conduit extending outwardly from the bottom of the discharge leg through the peripheral wall of the tank adjacent the bottom thereof and upwardly and back inwardly into registry with an opening in the peripheral wall of the tank spaced slightly from the top border. The gas delivery means includes a pair of pipe coupling nipples projecting upwardly and outwardly respectively from the upper part of the curved conduit of the inverted siphon. The gas generator is mounted in the lower inside of a liquid submerged vertical liquid circuiting stack by a group of circumferentially spaced struts projecting upwardly radially outwardly from the accumulator tank into engagement with the encircling stack wall.

The improved large bubble generator is simple, compact, and rugged, is reliable and efficient, easy to service and maintain, and of great versatility and adaptability.

DESCRIPTION OF THE PREFERRED EMBODIMENT

Figure 1:
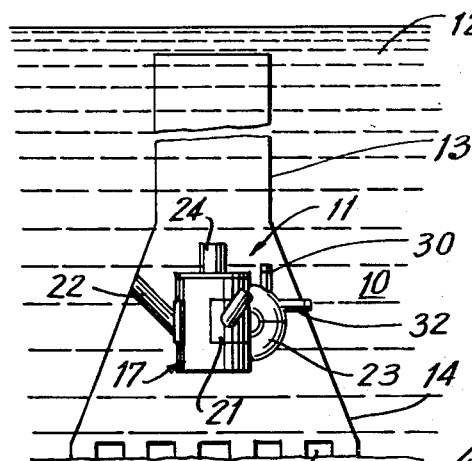
FIG. 1 is a fragmented front elevational view of a preferred embodiment of the present invention shown in operative association with a fluid circulating conduit.
Figure 2:
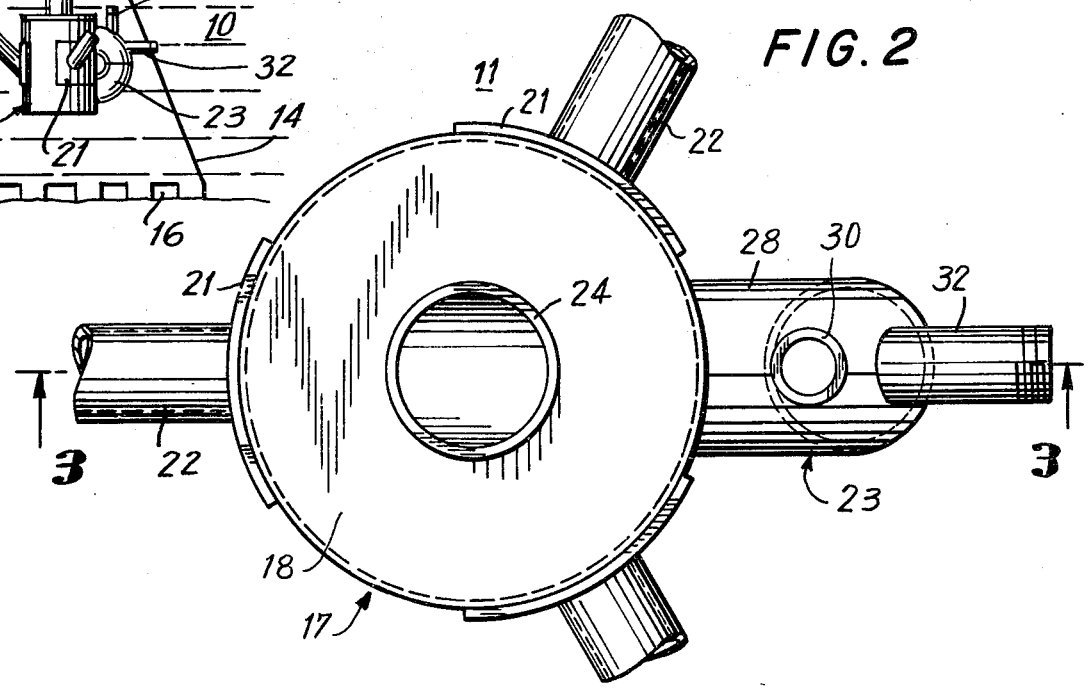
FIG. 2 is a fragmentary top plan view of the improved bubble generator therein.
Figure 3:
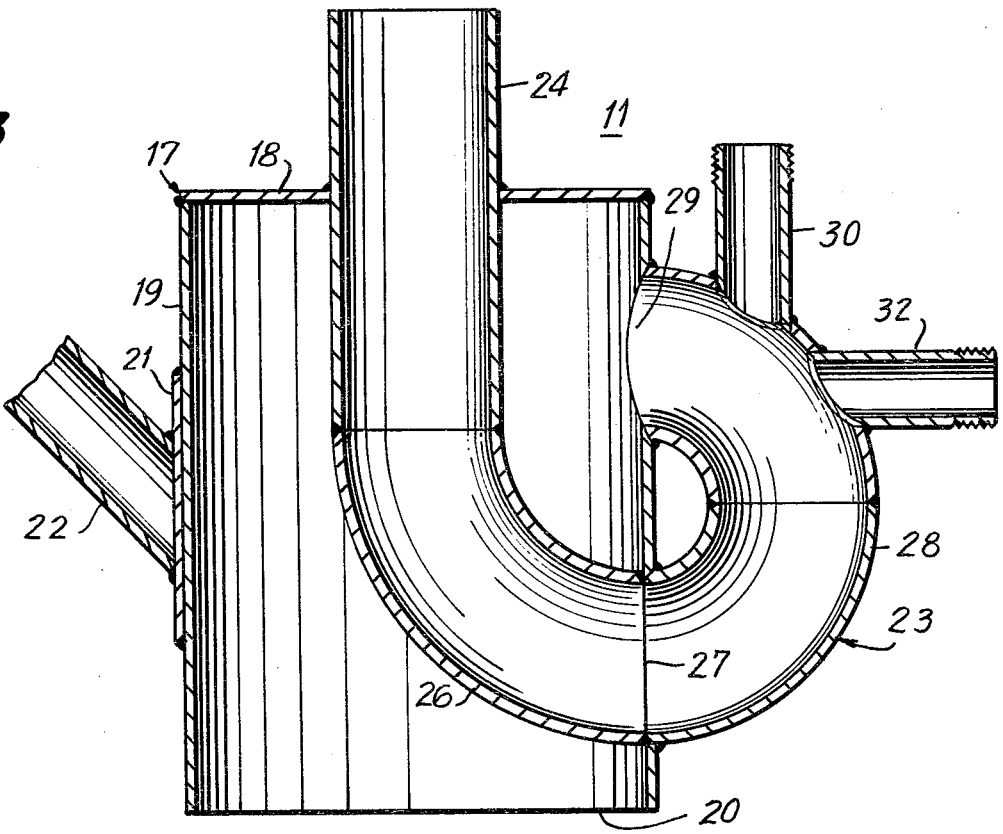
FIG. 3 is a section view taken along line 3—3 in FIG. 2.

Referring now to the drawings which illustrate a preferred embodiment of the present invention, reference numeral 10 generally designates a pump or circulating apparatus employing the improved large bubble generator 11. Apparatus 10 is shown, by way of example, as submerged in a body of water 12, such as a sewage digestion pond or the like, and comprises an open-ended vertical conduit or stack 13 whose top is slightly below the water level and whose lower portion is downwardly outwardly flared to provide a coaxial frustoconical base 14 resting on the bottom of the pond, and having peripherally spaced water inlet ports 16 along its bottom border.

Bubble generator 11 is disposed in the flared base section 14 proximate the top thereof, and comprises a circular cylindrical gas accumulator tank 17 having a flat circular top wall 18, a depending cylindrical peripheral wall 19, and a completely open bottom 20 exposed to the liquid in the base section 14 of the stack, accumulator tank 17 being coaxial with stack 13. A plurality of curved shaped reinforcing pad plates 21, for example, three as illustrated, are regularly circumferentially spaced about and superimposed on the outer face of peripheral wall 19 intermediate its top and bottom, and are firmly secured thereto as by welding. Projecting radially outwardly and upwardly from each of the pad plates 21 is a tubular support strut 22. The lower end of each strut 22 is secured to a corresponding pad plate 21, as by welding, and the upper end thereof is suitably secured to the wall of flared base section 14.

Bubble generator 11 also comprises a large inverted siphon 23 which includes a linear vertical gas or bubble discharge leg which is coaxial with accumulator tank 17 and registers with and projects through a central opening in tank top wall 18, and is welded thereto. Siphon leg 24 extends upwardly above top wall 18 and downwardly to somewhat above the medial level in accumulator tank 17. A downwardly, outwardly curved arcuate siphon leg 26 of about 90° extends from the bottom of and is joined to and communicates with the bottom of discharge leg 24, and has its lower, outer end registering with and welded to the border of a corresponding port 27 formed in the lower border of the peripheral wall 19 of tank 17. A semicircular tubular siphon leg 28, advantageously formed of a pair of end-to-end welded 90° sections, extends externally of accumulator tank 17, upwardly and outwardly from the port 27, and then inwardly to a corresponding port 29 formed in the upper border of the tank's peripheral wall 19, the upper and lower ends of siphon leg 28 being welded to the borders of the respective upper and lower ports 29 and 27 respectively.

Projecting vertically upwardly from the upper section of siphon leg 28 and welded thereto and communicating with the interior thereof is an elongated pipe coupling nipple 30 which is externally threaded at its top. Also, projecting horizontally radially outwardly from the upper section of siphon leg 28, spaced below nipple 30, is an elongated tubular nipple 32 similar to nipple 30, welded to and communicating with the interior of the siphon leg 28.

The application and operation of the apparatus 10 and the large bubble generator 11 described above are similar to that explained in the above-identified U.S. Pat. No. 3,592,450 to G. M. Rippon. Air or other gas is delivered to the gas accumulator tank 17 through pipes or hoses connected to one or both of the nipples 30, 32, the unconnected nipple being closed by a screw cap, or gas may be otherwise continuously delivered to accumulator tank 17, for example, through its open bottom 20 through ports 16. The supplied gas enters tank 17 and lowers the water level therein until it reaches below the level of the upper edge of port 27, at which point the gas accumulated in tank 17 and in the upper part of siphon leg 28 is rapidly siphoned out of tank 17 by way of inverted siphon 23, and rapidly discharged through the top of the siphon discharge leg 24 as a single body to form a large unit bubble which rises in stack 13 and functions to move ahead of it and raise the liquid therein, thereby to effect the circulation of the liquid in the body 12 thereof. With the ejection of a bubble, tank 17 refills with liquid, and the bubble generating cycle is periodically repeated at a rate depending on the rate of gas delivery.

As compressed gas is fed into the bubble generator by a gas supply pipe line by way of, preferably, nipple 32, it gradually lowers the liquid level in the tank 17 and siphon leg 28. This action continues until the liquid level in the tank 17 and siphon leg 28 reaches the entry level to the central stand pipe or discharge leg 24 which is located at the upper edge of port 27. As soon as the gas breaks the liquid seal at the top of port 27, it is free to travel into siphon legs 26 and 24, and an inverse siphon action takes place resulting in the sudden release of all the accumulated gas in the tank 17 and siphon 23 through the siphon legs 26 and 24 in the form of a large single gas bubble.

The locations of both nipples 30 and 32 are chose primarily to facilitate access to the siphon legs and tank in case the blockage of internal passages occurs. To unclog the blockage, a semi-flexible cable with an auger at its end is rotated and fed through the gas supply piping from above the digester cover. This facilitates the cleaning of the interior sections of the bubble generator 11 without its removal or without removal of the entire apparatus 10 from the digester and without loss of the digester gas pressure. Either of the two nipples 30 or 32 can be used as a connection for the gas supply piping and/or rodding. However, the location of nipple 32 as the gas supply connection is preferred because of the counter flow of gas issuing through that point against actual siphon action. This counter-flow allows for higher bubble frequency formation by the creation of a physical barrier immediately after bubble emission, therefore, delaying any undesirable motoring of the bubble generator. The use of different siphon leg elbows and their C configurations permits the easy centering of the discharge leg 24, and also shortens the total travel passage of gas and the stroke length of the bubble generator to form one large gas bubble. A higher frequency of bubble formation can be achieved by the introduction of supplementary space in the tank 17, above the level of the top edge of port 29. Good separation of bubbles has been found through experiments with the modification of such supplementary space within 5% to 20% of the actual working volume of the bubble generator. This feature is particularly advantageous in installations where the length of the stack pipe 13 is limited due to a shallow depth, and a continuous, not pulsating, flow through the stack must be maintained.

While there has been described and illustrated a preferred embodiment of the present invention, it is apparent that numerous alterations, omissions, and additions may be made without departing from the spirit thereof.

I claim:

1. A device for circulating a fluid in a body of said fluid comprising a vertically extending conduit having an upper discharge opening and a lower inlet opening submerged in said fluid body and a large bubble generator supported at the lower part of said conduit and comprising a gas accumulator tank having a peripheral wall, a top wall, and having an opening at its bottom, an inverted siphon including a vertically extending discharge tubular leg disposed within said tank and registering with an opening in said top wall and terminating in an upper bubble discharge opening directed into said conduit, a lower tubular leg extending from said gas discharge leg below the top thereof outwardly through said peripheral wall proximate the bottom thereof and an outer leg extending upwardly and inwardly into registry with an opening in said peripheral wall proximate the top thereof, and means for delivering a gas into said accumulator tank.

2. The fluid circulating device of claim 1 wherein said accumulator tank is cylindrical and open at its bottom and said bubble discharge leg is vertical and coaxial with said tank and projects upwardly through and beyond an opening in said top wall.

3. The fluid circulating device of claim 2 wherein said siphon lower and outer legs are defined by a continuously curved conduit extending from the bottom of said discharge leg downwardly and outwardly through the lower part of said peripheral wall, then outwardly upwardly and inwardly upwardly into registry with the opening proximate the top of the tank.

4. The fluid circulating device of claim 3 wherein said gas delivery means comprises a gas supply pipe connected to and communicating with the interior of the outer leg of said siphon.

5. The fluid circulating device of claim 4 including a pair of said gas supply pipes connected to and communicating with the interior of said siphon outer leg, one of said supply pipes projecting upwardly and the other of said pipes projecting outwardly from said outer leg.

6. The fluid circulating device of claim 1 including a plurality of peripherally spaced support struts projecting downwardly and inwardly from said tank peripheral wall into engagement with said conduit.

* * * * *

UNITED STATES PATENT AND TRADEMARK OFFICE
CERTIFICATE OF CORRECTION

PATENT NO. : 4,169,873
DATED : October 2, 1979
INVENTOR(S) : Peter Lipert

It is certified that error appears in the above-identified patent and that said Letters Patent is hereby corrected as shown below:

Page 1, in the Notice referring to a portion of the patent being disclaimed, change "January 2, 1981" to --July 2, 1995--

Signed and Sealed this

Thirty-first Day of December 1985

[SEAL]

Attest:

DONALD J. QUIGG

Attesting Officer

Commissioner of Patents and Trademarks